July 24, 1923.

G. B. COLEMAN 1,462,634

MEANS AND METHOD OF CONVERSION BETWEEN ALTERNATING AND DIRECT CURRENTS

Filed Dec. 11, 1919    2 Sheets-Sheet 1

INVENTOR
George B Coleman
BY John N Miller
Geo J Henry
ATTORNEYS

July 24, 1923.

G. B. COLEMAN 1,462,634

MEANS AND METHOD OF CONVERSION BETWEEN ALTERNATING AND DIRECT CURRENTS

Filed Dec. 11, 1919

INVENTOR
George B Coleman
BY John H Miller
Geo J Henry
ATTORNEYS

Patented July 24, 1923.

1,462,634

UNITED STATES PATENT OFFICE.

GEORGE B. COLEMAN, OF SAN FRANCISCO, CALIFORNIA, ASSIGNOR TO COLEMAN X-RAY COMPANY, OF SAN FRANCISCO, CALIFORNIA, A CORPORATION OF CALIFORNIA.

MEANS AND METHOD OF CONVERSION BETWEEN ALTERNATING AND DIRECT CURRENTS.

Application filed December 11, 1919. Serial No. 344,101.

*To all whom it may concern:*

Be it known that I, GEORGE B. COLEMAN, a citizen of the United States, and a resident of the city and county of San Francisco, State of California, have invented new and useful Improvements in Means and Methods of Conversion Between Alternating and Direct Currents, of which the following is a specification.

My invention has for its object the deriving of a direct current from an impressed alternating current, or the production of a current of any phase from an impressed direct current. These objects I attain by interrupting the neutral point of transformer windings and reversing the connections between said transformer windings so that they will be alternately connected to cause or permit current to flow in one direction through said transformer windings, and then in the opposite direction through said windings coincident with the change of polarity of the phase impressed or desired.

In the accompanying drawings and description thereof, I have illustrated my invention as applied to a 3-phase impressed electromotive force wave, but it will be understood that other phases may be employed by a suitable variation in the plurality of commutating members and their connections, also that a direct current electromotive force may be impressed, and an alternating current derived therefrom, such variations merely requiring the proper plurality of commutating elements herein disclosed.

Throughout the figures and following description I have illustrated my invention applied to a three phase transformation.

Figure 4:
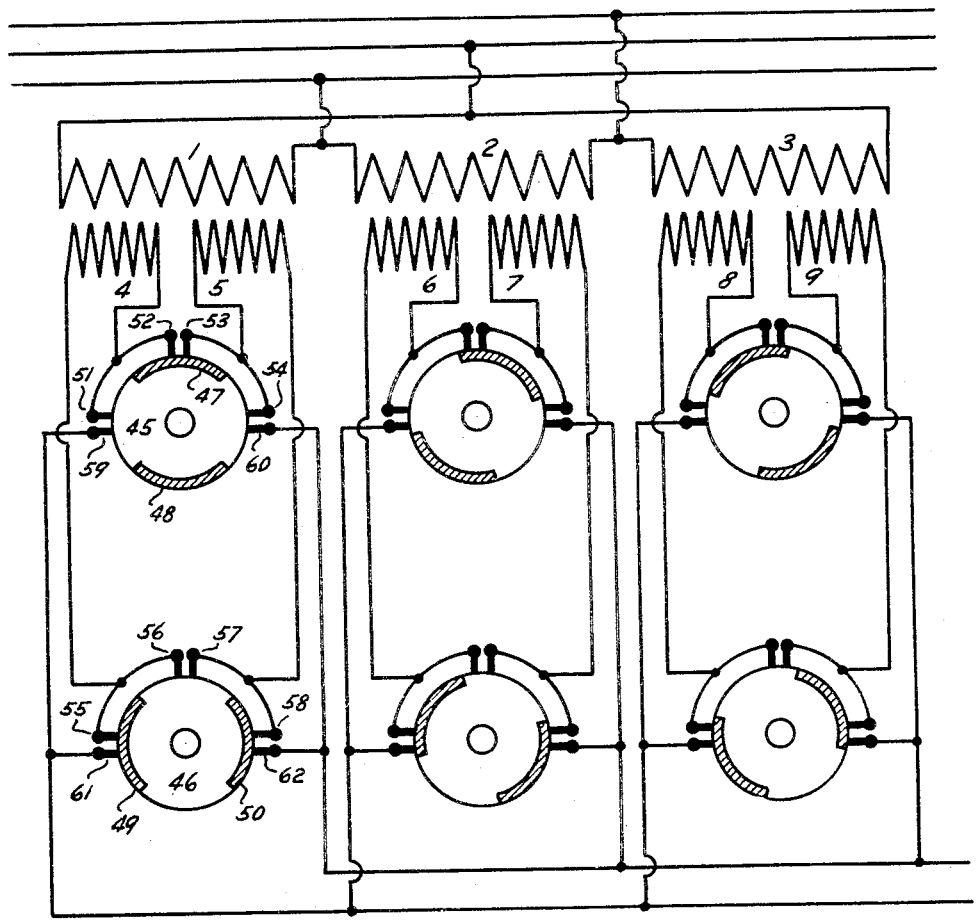

Fig. 4 illustrates a variation in the commutating means and brush connections by which the same results are attained, the transformer coils receiving the impressed three phase electromotive force are indicated by the numerals 1, 2, 3 and the corresponding secondary coils are indicated by 4, 5 and 6, 7 and 8, 9.

The coils 4, 5 together form the secondary corresponding with the primary coil 1 of the transformer for one of the phases, and these coils are grouped and divided at their neutral point during one polarity of the phase by the conductors 10, 11 respectively, and during the opposite polarity divided at their neutral point by the conductors 19, 20. The conductor 10 is provided with the brushes 12, 13 and the conductor 11 with the brushes 14, 15 of the three commutator elements 16, 17, 18.

The outside terminals of the coils 4 and 5 are connected by the conductors 19 and 20 respectively to the brushes 21, 22, and the brushes 23, 24 of the commutator elements 16, 17, 18 respectively. Each of these three commutators is provided with a pair of opposite contact members engaging substantially ¼ of the periphery of the commutator, and the said conducting members of the commutator 16 are spaced at their boundaries from the contact members of commutator elements of 17, 18, by an interval of arc corresponding substantially with the spark length of the derived electromotive force. The contact members of the elements of 17, 18 being in line with each other, the connection, however, from the said contact members as shown at 63, 64, 65, 66 providing the two legs 25, 26 respectively of the derived circuit.

The connections for the transformer coil 6, 7 and the transformer coil 8, 9 to their corresponding commutator elements are the same as that for the transformer coils 4, 5 and the elements themselves have the same structural features.

The position of the contacting members of the elements and the angular position of the elements themselves is, however, different from the elements 16, 17, 18 as shown, due to the time difference between the phases.

Figure 1:
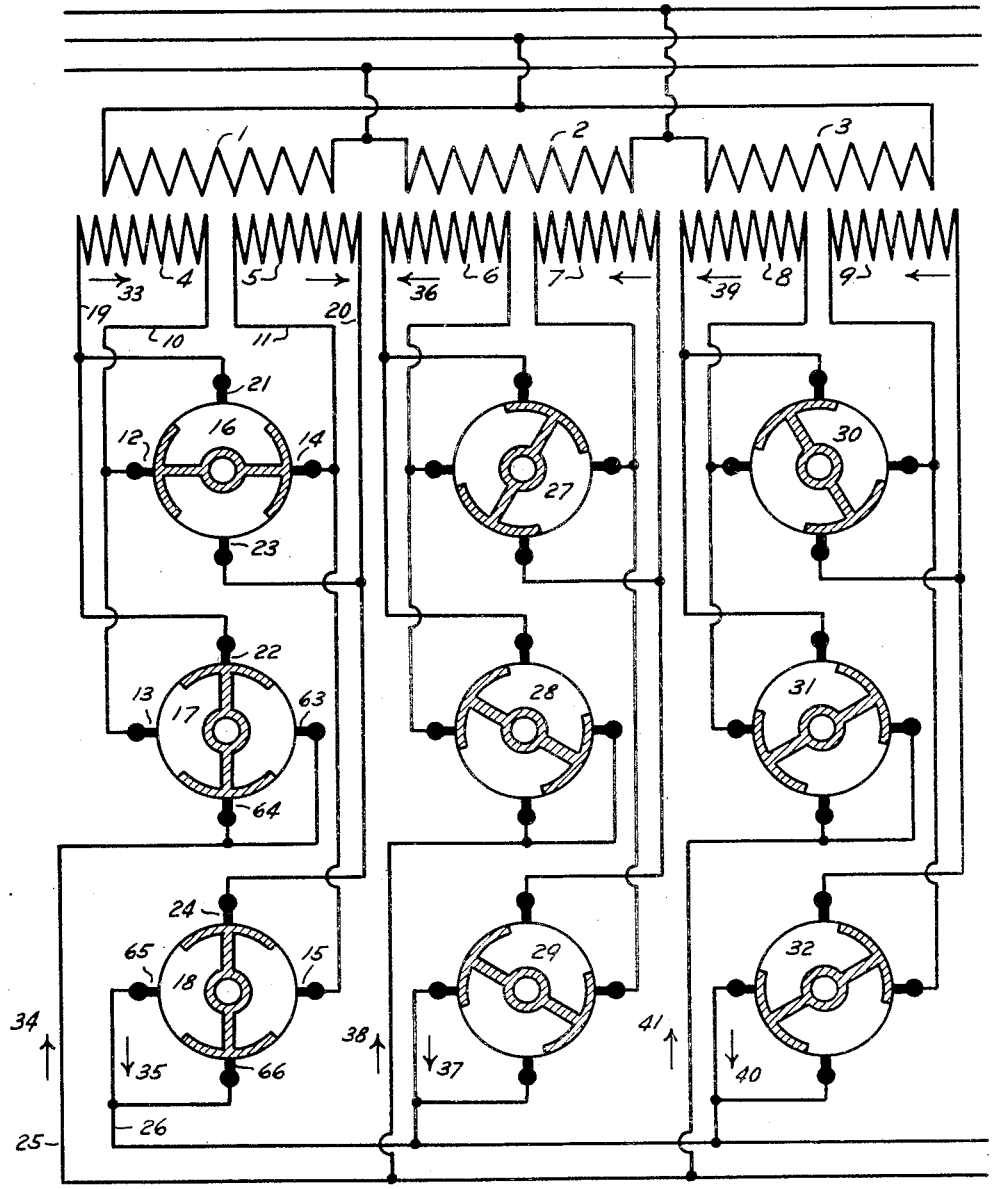
Fig. 1 illustrates diagrammatically the transformer coils and connections and commutating elements and the relative instantaneous position thereof.
Figure 2:
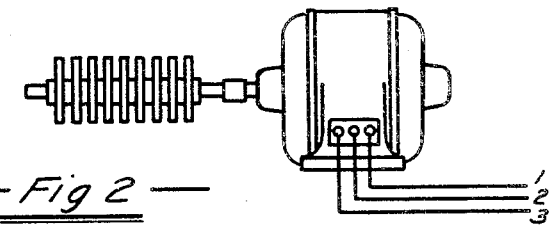
Fig. 2 illustrates the arrangement and mounting of the commutator segments and their operation, and the motor connections by which their operation is accomplished.

The said angular positions are to be in accordance with the phase relationship so that the wave of impressed electromotive force in each phase will induce a derived wave of direct current at the secondary terminals as 25, 26. It will be obvious that with the commutator segments of elements 16, 17, 18 in the position as shown at Fig. 1, that the coils 4 and 5 will be connected through the contact member of element 16, and the impressed current in coils 4 and 5 will be derived through the circuit of the terminals 25, 26, and that assuming the current flow as indicated by the arrow 33 in the coils 4, 5, the direction of the flow of the derived wave will be as shown by the arrows 34, 35. When, however, a rotation has occurred of the elements 16, 17, 18 in synchronism, and as for example into the positions 27, 28, 29 contacts through the three elements will have been transferred, so that assuming the direction of flow in the coils 6 and 7 to be as shown by the arrow 36, the derived wave will be as indicated by the arrows 37, 38. In other words, although the direction of flow in the coil 6, 7 has been reversed from that of 4, 5, the direction of the derived current will have remained the same.

Referring to the coils 8, 9, and assuming the direction of flow therein to be as shown by the arrow 39, the direction of the derived direct current will be as shown by the arrows 40, 41. In other words, although the electromotive force curve is on the opposite side of the neutral line (see Fig. 3) in the coils 6, 7 and 8, 9, from that of coils 4, 5 the derived direct current from all three phases will have the same direction of flow. These may therefore be connected in parallel, or series, and the current obtained from all three phases, regardless of the polarity of the phase, will flow in the derived circuit as a direct current.

Figure 3:
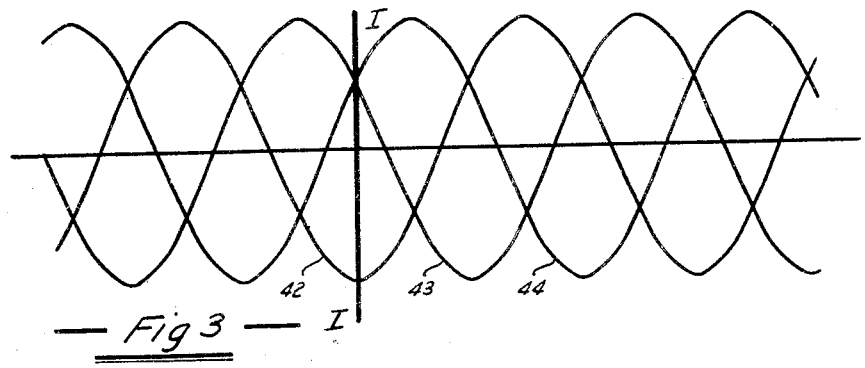
Fig. 3 shows diagrammatically the phase relationship of the alternating current supposed to be acting in the primary circuit of Fig. 1, and in which the line I—I corresponds with the instantaneous value for the commutator segment positions of Fig. 1.

Referring specifically to Fig. 3 the three waves of the phase of the impressed electromotive force are shown at 42, 43, 44 respectively, and the instantaneous values corresponding with the position of the commutator segments of Fig. 1 are indicated by ordinates on the line I—I, and although the polarity values of two of these phases, that of 43, 44 is opposite to that of 42, the derived current from all three groups of commutator elements will be unidirectional.

It will be noted that the result has been attained through a commutating of the derived wave and a commutating at the neutral point of the transformer windings such that although the polarity is reversed in the transformer secondaries by the impressed electromotive force, the commutating terminals of the two halves of the secondary coil of each phase have been connected through the commutators such that the neutral point of the transformer secondary coil is first between the adjacent ends 10, 11 of 4, 5 Fig. 1, and during one half of the phase, at which time the derived current is obtained through the connections with 19, 20; and during the other half of the phase the terminals 19, 20 will become the neutral point and the derived wave flows through the conductors 10 and 11. The same sequence of flow takes place from the transformer secondaries 6, 7 and 8, 9 the difference being that of the angular relationship of the commutator elements.

It is intended that all nine of the commutator elements of Fig. 1 shall run in synchronism having relative angular positions as shown in Fig. 1.

I have shown a variation in the structural details and connections of the commutating elements in Fig. 4, in which elements 45, 46 are provided with contact segments 47, 48, 49, 50 and double connected brushes 51, 52 and 53, 54, and 55, 56 and 57, 58 respectively, and single brushes 59, 60, 61, 62 by which it will be seen that the same reversal of the position of the neutral point and polarity of the derived wave will be reversed whenever the impressed wave crosses the neutral line.

Reference is herein made to my copending applications: Serial 327,513, filed Sept. 30, 1919, Serial 331,033, filed Oct. 16, 1919, Serial 331,034, filed Oct. 16, 1919, Serial 361,584, filed Feb. 26, 1920.

I claim:

1. In a transformation system, a plurality of dephased secondary windings each divided at substantially its center and provided with a commutating device, a second commutating device interposed in each of the dephased secondary windings, means adapted to rotate said commutators in synchronism with an impressed wave, said commutators spaced angularly in accordance with the phase differences of the secondary windings.

2. In a polyphase transformer adapted to supply a work circuit a plurality of secondary windings each consisting of two equal parts, each part provided with an inside and outside terminal, three commutators for each secondary winding and all of said commutators adapted to be driven in synchronism, and each group of three of said commutators constructed and adapted to alternately connect the work circuit with the outside and then with inside pairs of terminals of the corresponding winding, and the groups of commutators angularly spaced in accord with the phases.

In testimony whereof, I have hereunto set my hand at San Francisco, California, this 4th day of December, 1919.

GEORGE B. COLEMAN.

In presence of—
C. B. SMITH,
H. GUYER.